(No Model.)  2 Sheets—Sheet 1.
G. W. RICHARDSON.
SAFETY VALVE.
No. 283,146.  Patented Aug. 14, 1883.
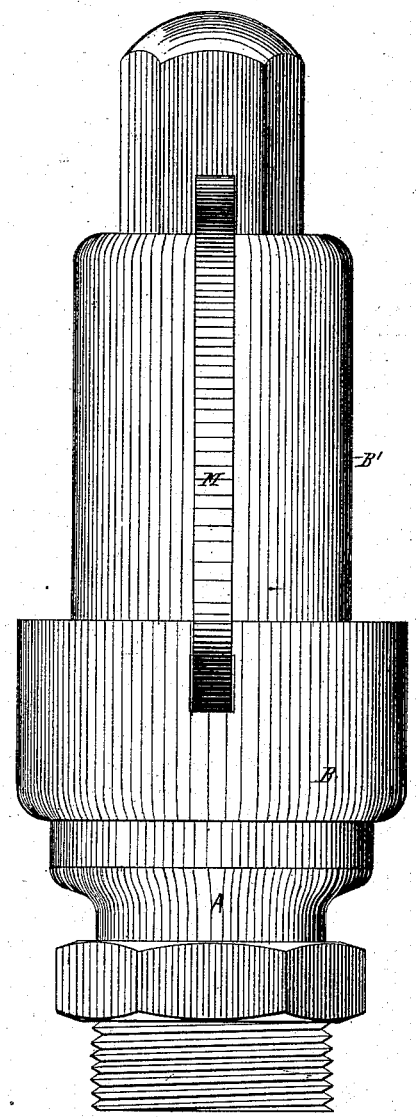
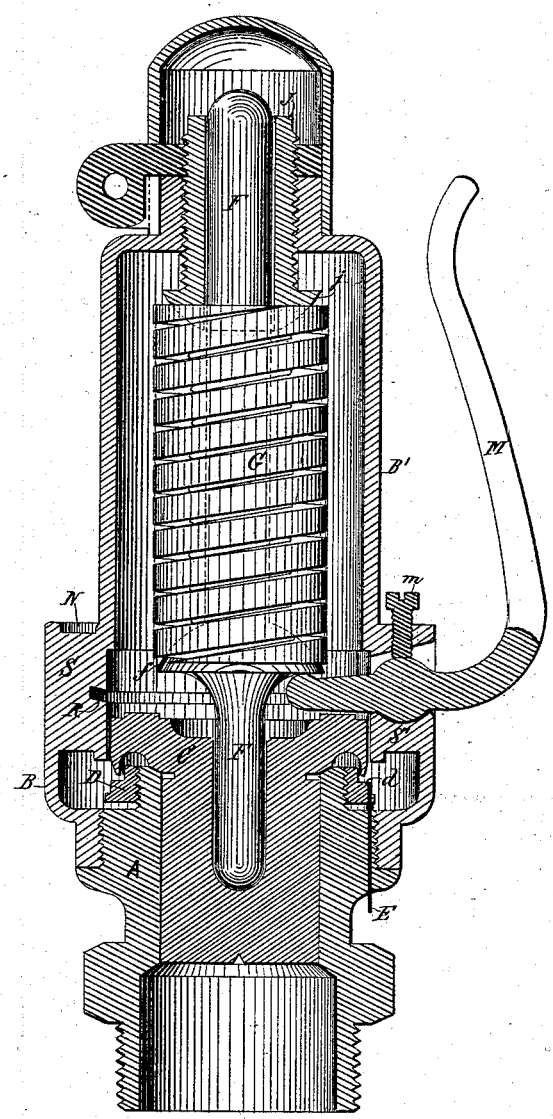

(No Model.) 2 Sheets—Sheet 2.
G. W. RICHARDSON.
SAFETY VALVE.
No. 283,146. Patented Aug. 14, 1883.
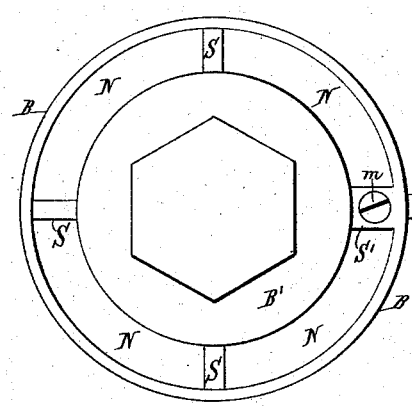
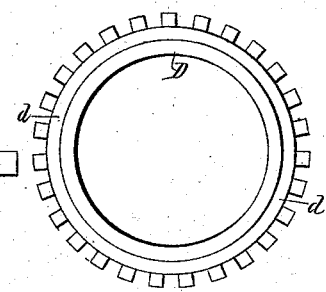
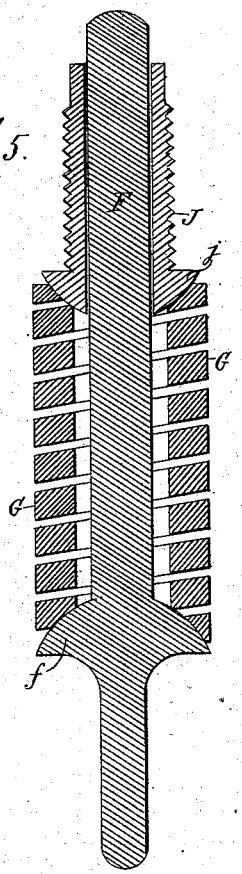
Witnesses:
John Buckler,
Henry Fieb
George W. Richardson,
Inventor.
By Worth Osgood
Attorney.

UNITED STATES PATENT OFFICE.

GEORGE W. RICHARDSON, OF BOSTON, MASS., ASSIGNOR TO THE CONSOLIDATED SAFETY VALVE COMPANY, OF HARTFORD CONN.

SAFETY-VALVE.

SPECIFICATION forming part of Letters Patent No. 283,146, dated August 14, 1883.

Application filed May 2, 1883. (No model.)

*To all whom it may concern:*

Be it known that I, GEORGE W. RICHARDSON, of Boston, county of Suffolk, and State of Massachusetts, have invented certain new and useful Improvements in Safety-Valves, of which the following is a full, clear, and exact description, reference being had to the accompanying drawings, and to the letters of reference marked thereon.

My invention has relation to safety-valves for steam and other boilers, particularly to that class now commonly known as the "Richardson valve;" but, as will be understood from the following explanations, the improvements might be applied upon valves of various other patterns.

Among the objects of my invention are the provision of a cheap and easily-constructed means of locating and maintaining the hand-lever in place without interfering with the functions of the valve-casing and appliances for preventing the noise of escaping steam, the formation of a step or annular ledge around the adjustable ring, located beneath the lip of the valve or beneath the annular groove therein for the purpose of breaking up the current of escaping steam, and the provision of simple means for adjusting the tension of the valve-spring so as to avoid canting or unequal bearing of the spring on the valve.

To accomplish these objects, my improvements involve certain novel and useful arrangements or combinations of parts and peculiarities of construction, all of which will be herein first fully described, and then pointed out in the claims.

In the accompanying drawings, forming part of this specification, Figure 1 is an elevation, and Fig. 2 an axial section and partial elevation, of a safety-valve constructed and arranged in accordance with my invention. Fig. 3 is a plan or top view of the same. Fig. 4 is a plan of the adjustable ring intended to be located beneath the annular groove in the valve. Fig. 5 is a vertical section and partial elevation of the spring and valve-spindle with the tension-screw thereon, these parts being shown as separated or removed from the casing and valve.

In all these figures like letters of reference, wherever they occur, indicate corresponding parts.

A is the base part of the valve-case, usually made with an angular rim for facilitating the application of a wrench, and provided at bottom with a male or female screw, whichever may be desired. Within this base part is located the valve C, and upon it (the base) is screwed the main part of the case, which extends up so as to envelop the spring G. This main part of the case is formed of concentric walls B and B', the wall B forming with B' an annular outlet, N, which conducts and discharges all the steam blown off from the safety-valve These two walls are united by ribs or feathers S S' at suitable distance, and the wall B extends up above the level of the top of the valve, substantially as indicated. Through the wall B', and above the limit of movement or ordinary lifts of the valve, is cut or otherwise formed a channel, R, made to incline upwardly, the ribs S and S' serving to prevent severance of the parts by the cutting. This channel establishes a communication between the space in the casing above the valve and the annular discharge-outlet N, so that the passing steam will tend to create a vacuum in the said space, (upon principles well understood,) and thus relieve the valve of any pressure on its top or head which may be due to the presence of steam or air in said space. The effect of this construction and operation is to make the valve sensitive, accurate, and reliable in its action, and to relieve the device of one possible obstruction to the instantaneous movements of the valve.

The hand-lever M projects through a slot cast in or cut through the lower part of the casing and through the rib S', which is made large enough for the purpose. The inner end of the lever enters the space above the valve and engages with the under side of the projection $f$ upon the spindle, the lever resting and turning upon the lower margin of the slot which forms the fulcrum. The screw $m$ enters the rib S', and, being properly turned down, prevents accidental withdrawing of the lever, and holds it always in proper working position. This construction obviates the use of the bearing-pin usually applied to form the fulcrum of the lever, and obviates the necessity of making any projections upon the side of the casing to support the fulcrum; and by reason of this the casing and lever-bearing can be more cheaply made than heretofore, there being no projection upon the side of the casing which will interfere with its being turned in an ordinary lathe. The construction of the lever also renders it less expensive than when a pin or axle is employed, less liable to damage or disarrangement from use or accident, and more easily and quickly adjustable to its final seat. By loosening the screw *m* the lever can be easily withdrawn whenever required. Since the lever passes directly through the slot in the rib S', and that slot has no communication with the annular passage for escaping steam, the lever will in no way interfere with the efficient working of the casing and its adjuncts.

The base-piece A has a central upward projection, upon which the seat for the valve is formed, and upon this projection I cut a screw-thread to receive the correspondingly-threaded ring, D. This ring is made adjustable up and down to vary the distance between its top and the lip of the valve which has the usual annular groove, and it (the ring) is provided with a flange or step, *d*, as plainly indicated, the purpose of which is to break up the current of steam escaping past the valve and prevent it (the current) from running clear to the bottom of the escape-channel, where it would, without being broken up, restrict the free action of the valve on its downward or closing movement by backing up under the annular groove of the valve. The ring is provided with a series of notches or teeth, or equivalent, as shown in Fig. 4, extending around the margin, with which notches or teeth the lock-pin E, Fig. 2, is made to engage after the ring has been properly adjusted. The pin passes in from the exterior of the casing, and operates to hold the ring steadily in proper place. The pin may be secured in any desired way, as by upsetting the end thereof.

F is the spindle, stepped in the valve C in the ordinary manner, and G is the spring, which holds the valve to its seat until dislodged by steam-pressure upon its under side. Both ends of the spring are rounded out or "balled out." The lower end of the spring rests upon the top of the rounded or balled projection *f* upon the spindle, and the upper end receives a similar rounded projection, *j*, upon the adjusting-screw J, which screw is adjustable up and down within the threaded upper part of the casing by the application of a suitable tool. This screw forms a good guide for the spindle, keeping it true to line in all its movements. The casing and valve being in place, by turning the adjusting-screw down the spring will be compressed to any desired degree. The rounded projections, between which the spring is clamped, and the balled ends of the spring fitting over such projections, obviate any side cramping or wedging of the spring, by which its accuracy and free movement might be impaired. This construction is simple and efficient, and when compared with other arrangements for like purposes will be found less expensive to make, more durable, and less liable to be disarranged during use of the valve. By extending the wall B well up above the level of the valve-seat, substantially as shown, and by directing the escaping steam through the annular passage or outlet, and providing said passage with the ribs S S', which serve to break up the currents of escaping steam, as well as to connect the two parts of the casing, the noise produced by the steam is very much diminished. This is an important feature, and one which adds very much to the desirable qualities of the structure. The annular escape-passage should be so proportioned in height and area of outlet-openings as to obviate any excess of back-pressure in the passage which would interfere with the successful working of the valve. For one size of valve about the proper portions are indicated in the drawings.

The above-described arrangements and constructions are found in practice to admirably answer the several purposes or objects of the invention, as previously stated.

Having now fully described my invention, what I claim as new, and desire to secure by Letters Patent, is—

1. In combination with the spindle of the valve, the hand-lever located in a slot cut through the outer casing and arranged to bear upon the lower margin of said slot, leaving the exterior of the casing plain, and a setting-screw arranged to prevent accidental displacement of the lever, substantially as and for the purposes set forth.

2. The two parts of the valve-casing having the annular steam-passage between them, the outer part extending up and around the inner part above the valve-seat, and the ribs located in said passage, one of the ribs being perforated to admit the lever, substantially as shown and described.

3. In combination with the lever passing through a slot in the rib located in the annular escape-channel, the setting-screw arranged to maintain said lever against accidental displacement, substantially as shown and described.

4. The adjustable ring provided with a series of marginal annular ledges, forming an angular step upon the perimeter of said ring, the same being combined with the safety-valve, having an annular groove, substantially as and for the purposes set forth.

5. The spiral spring for governing the action of the safety-valve, the same being balled out at top and bottom, as explained, and clamped between rounded projections on the adjusting-screw and spindle, the same being combined with the valve and arranged to operate substantially as and for the purposes set forth.

In testimony that I claim the foregoing I have hereunto set my hand in the presence of two witnesses.

GEO. W. RICHARDSON.

Witnesses:
  JOHN BUCKLER,
  WORTH OSGOOD,